US006589423B1

(12) United States Patent
Chancellor

(10) Patent No.: US 6,589,423 B1
(45) Date of Patent: Jul. 8, 2003

(54) FILTRATION SYSTEM WITH MODULARIZED ENERGY RECOVERY SUBSYSTEM

(75) Inventor: Dennis Chancellor, Falls of Rough, KY (US)

(73) Assignee: Nate International, Woodland Hills, CA (US)

( * ) Notice: Subject to any disclaimer, the term of this patent is extended or adjusted under 35 U.S.C. 154(b) by 0 days.

(21) Appl. No.: 09/647,229

(22) PCT Filed: May 25, 1999

(86) PCT No.: PCT/US99/11544

§ 371 (c)(1),
(2), (4) Date: Nov. 15, 2000

(87) PCT Pub. No.: WO99/62613

PCT Pub. Date: Dec. 9, 1999

Related U.S. Application Data

(60) Provisional application No. 60/087,615, filed on Jun. 2, 1998.

(51) Int. Cl.[7] ............................................... B01D 61/06
(52) U.S. Cl. ............... 210/321.66; 210/258; 210/323.1; 210/416.1; 210/433.1
(58) Field of Search ............................. 210/195.2, 252, 210/253, 258, 323.1, 323.2, 433.1, 321.66, 416.1, 485, 641, 652

(56) References Cited

U.S. PATENT DOCUMENTS

| 4,125,463 A | * | 11/1978 | Chenoweth | 210/460 |
| 4,321,137 A | * | 3/1982 | Kohler | 210/321.66 |
| 4,973,408 A | * | 11/1990 | Keefer | 210/652 |
| 4,983,305 A | * | 1/1991 | Oklejas et al. | 210/321.66 |
| 5,914,041 A | * | 6/1999 | Chancellor | 210/641 |
| 5,944,999 A | * | 8/1999 | Chancellor et al. | 210/321.78 |
| 5,980,751 A | * | 11/1999 | Chancellor | 210/652 |

* cited by examiner

*Primary Examiner*—John Kim
(74) *Attorney, Agent, or Firm*—Rutan & Tucker, LLP

(57) ABSTRACT

A filtration system has a plurality of filtration modules disposed within an outer casing, which produce both a low pressure filtrate and a high pressure waste fluid from a pressurized feed fluid. The subsystem used to pressurize the feed fluid is mechanically coupled to the subsystem used to recover energy from the waste fluid such that energy in the high pressure waste fluid is used to pressurize the feed fluid. The pressurization and energy recovery subsystems are preferably coupled using a common drive shaft and at least one of the pressurization and energy recovery subsystems may advantageously contain a turbine.

8 Claims, 3 Drawing Sheets

FILTRATION SYSTEM WITH MODULARIZED ENERGY RECOVERY SUBSYSTEM

This application claims the benefit of provisional No. 60/087,615 filed Jun. 2, 1998.

FIELD OF THE INVENTION

The field of the invention is filtration systems.

BACKGROUND OF THE INVENTION

Filtration systems often require substantial pressure to drive a fluid through a membrane or other filter. In the case of reverse osmosis systems, this pressure requirement can translate into a substantial energy cost or "penalty."

It is known to mitigate the energy cost of filtration pumping by employing a work exchange pump such as that described in U.S. Pat. No. 3,489,159 to Cheng et al. (January 1970) which is incorporated herein by reference. In such systems, pressure in the "waste" fluid that flows past the filter elements is used to pressurize the feed fluid. Unfortunately, known work exchange pumps employ relatively complicated piping, and in any event are discontinuous in their operation. These factors add greatly to the overall cost of installation and operation.

It is also known to mitigate the energy cost of filtration pumping on a continuous basis by employing one or more turbines to recover energy contained in the "waste" fluid. A typical example is included as FIG. 3 in PCT/ES96/00078 to Vanquez-Figueroa (publ. October 1996), which is also incorporated herein by reference. In that example, a feed fluid is pumped up a mountainside, allowed to flow into a filtration unit partway down the mountain, and the waste fluid is run through a turbine to recover some of the pumping energy.

A more generalized schematic of a prior art filtration system employing an energy recovery turbine is shown in FIG. 1. There a filtration system 10 generally comprises a pump 20, a plurality of parallel permeators 30, an energy recovery turbine 40, and a permeate or filtered fluid holding tank 50. The fluid feed lines are straightforward, with an intake line (not shown) carrying a feed fluid from a pretreatment subsystem (not shown) to the pump 20; a feed fluid line 22 conveying pressurized feed fluid from the pump 20 to the permeators 30; a permeate collection line 32 conveying depressurized permeate from the permeators 30 to the holding tank 50; a waste fluid collection line 34 conveying pressurized waste fluid from the permeators 30 to the energy recovery turbine 40; and a waste fluid discharge line 42 conveying depressurized waste fluid from the energy recovery turbine 40 away from the system 10.

A system according to FIG. 1 may be relatively energy efficient, but is still somewhat complicated from a piping standpoint. Among other things, each permeator 30 has at least three high pressure fluid connections—one for the feed fluid, one for the waste fluid, and one for the permeate. In a large system such fluid connections may be expensive to maintain, especially where filtration elements in the permeators need to be replaced every few years.

Thus, there is a continuing need for a simplified approach to recovering energy costs employed in pressurizing a filtration system.

SUMMARY OF THE INVENTION

The present invention is directed to filtration systems in which a plurality of filtration modules disposed within an outer casing produce both a low pressure filtrate and a high pressure waste fluid from a feed fluid, and energy in the high pressure waste fluid is used to pressurize the feed fluid.

In preferred embodiments the feed fluid is pressurized using a pressurization subsystem, the energy in the waste fluid is recovered using an energy recovery subsystem, and the pressurization and energy recover subsystems are mechanically coupled such that energy derived from the energy recovery subsystem is used to drive the pressurization subsystem. In more preferred embodiments at least one of the pressurization and energy recovery subsystems utilize a turbine. In still more preferred embodiments the pressurization and energy recovery subsystems are coupled using a common drive shaft.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
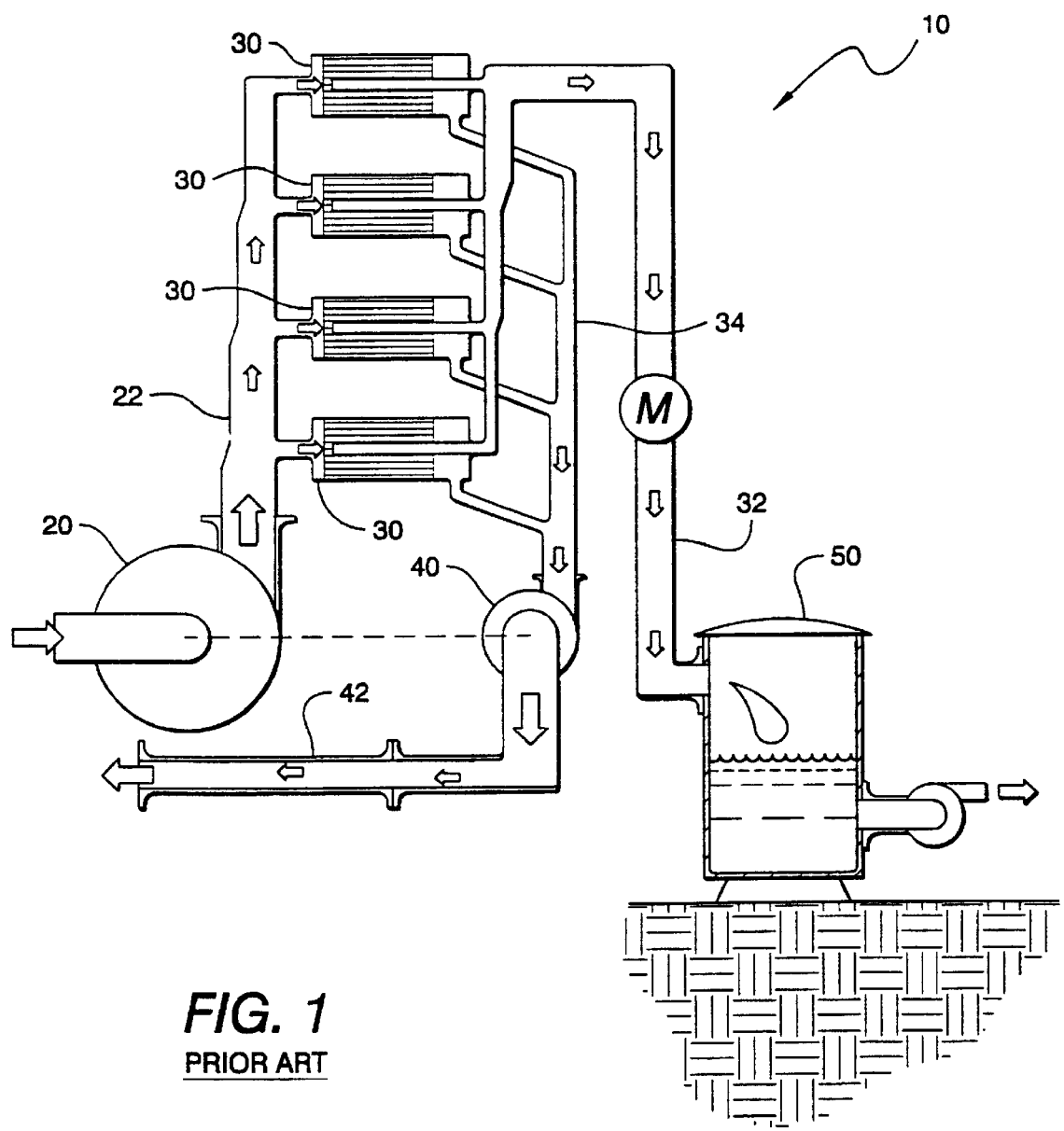
FIG. 1 is a schematic of a prior art filtration system employing an energy recovery turbine.
Figure 2:
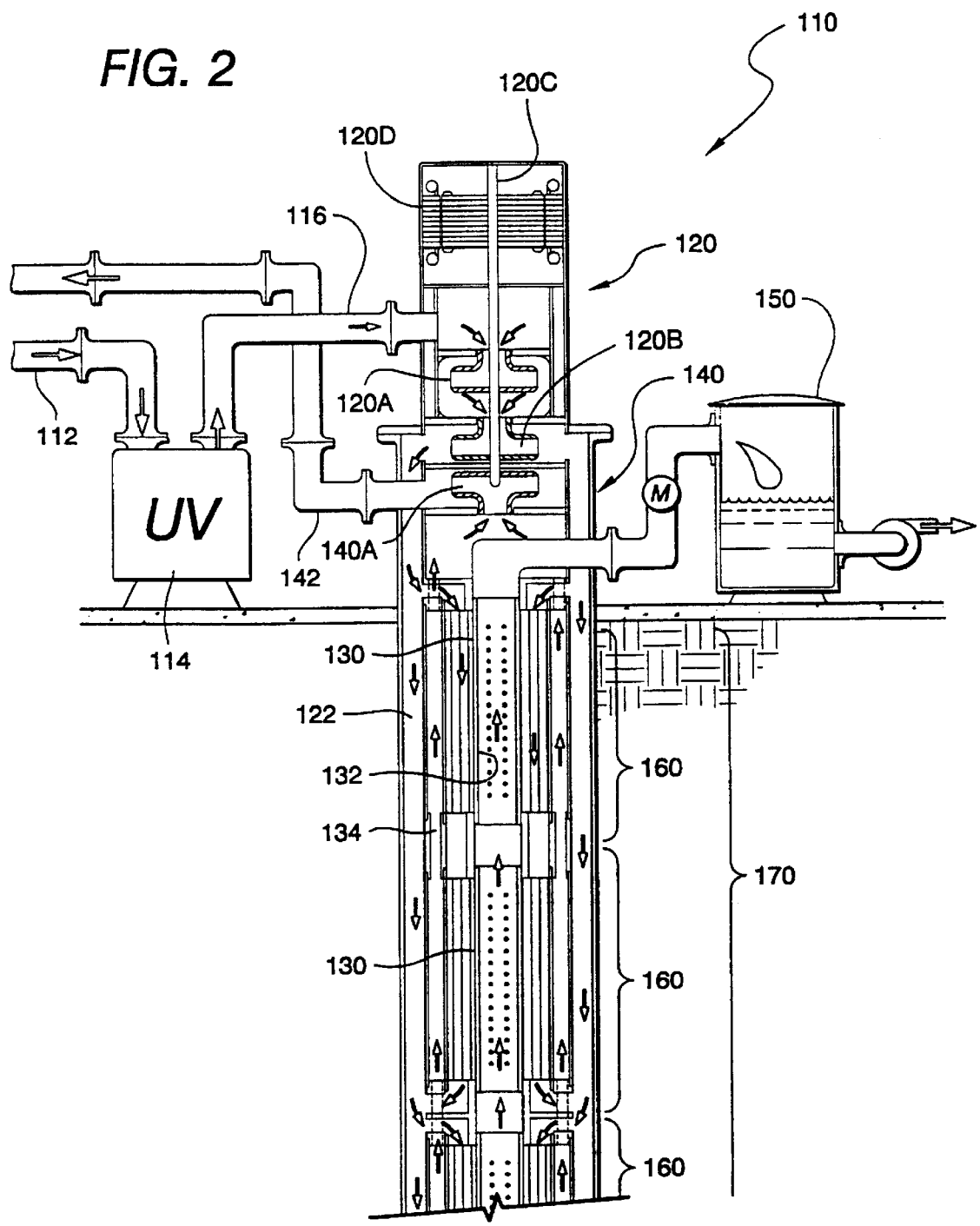
FIG. 2 is a schematic of a filtration system according to the present invention employing an energy recovery subsystem.

In FIG. 2 a preferred filtration system 10 generally comprises a pressurizing subsystem 120, a plurality of reverse osmosis or other filter modules 130, an energy recovery subsystem 140, and a permeate or filtered fluid holding tank 150. Analogously to FIG. 1, a feed fluid from line 112 enters a pretreatment subsystem 114, and then passes to the pressurizing subsystem 120 via line 116. Upon pressurization, a feed fluid line 122 conveys pressurized feed fluid from the pressurizing subsystem 120 to the filter modules 130; a permeate collection line 132 conveys depressurized permeate from the filter modules 130 to the holding tank 150; a waste fluid collection line 134 conveys pressurized waste fluid from the filter modules 130 to the energy recovery subsystem 140; and a waste fluid discharge line 142 conveys depressurized waste fluid from the energy recovery subsystem 140 away from the system 110.

Also analogously to FIG. 1, it is contemplated that the feed fluid of FIG. 2 may be any fluid amenable to treatment by filtration. In a great many instances the feed fluid will comprise water, or at least an aqueous solution such as such as salty or briny water. In other instances, the feed fluid may comprise a food, such as orange juice, or perhaps a petroleum intermediary that requires purification.

Quite unlike the filtration system 10 of FIG. 1, however, the filtration system 110 of FIG. 2 contemplates that the various filter modules 130, and at least portions of feed fluid line 132, permeate collection line 132, and waste fluid collection line 134 are all at least substantially contained within an outer casing to form a large tube assembly 170. In one contemplated form of such coupling, the modules are serially disposed in an end-to-end fashion in production modules 160, with the continuous casings of the modules forming the casing of the large tube assembly, and feed fluid flowing sequentially through upstream modules to reach downstream modules. In other contemplated embodiments, at least some of the filter modules 160A, 160B are disposed parallel to one another within an outer casing of the large tube assembly, such that feed fluid flows through the lumen of the outer casing, and reaches individual filter modules without necessarily passing through other filter modules. Still other embodiments (not shown) contemplate the filter modules disposed in an outer casing such that the feed fluid flows to the filters in some combination of serial and parallel flow.

Production modules 160 may advantageously be similar in many respects to the production modules 40 described in the WO 98/09718 publication, although here there is less constraint on the diameter than previously contemplated. In addition, the production modules 160 are contemplated to be disposed in any relationship to vertical, including vertical, off-vertical, and even horizontal. As such, the large tube assembly 170 may be disposed more or less horizontally on, above or below the surface of the ground, or in some other configuration such as a partially buried disposition. In other contemplated embodiments, for example, the large tube assembly 170 may be set into a shallow well, perhaps less than 100 or even less than 50 feet deep. In still other embodiments, the large tube assembly 170 may be disposed within or as part of a tower, hillside or mountain. In yet another aspect, multiple large tube assemblies 170 may be coupled together to form a field of assemblies (not shown), in any combination of dispositions.

Turning in greater detail to the pressurizing subsystem 120, it is contemplated that any pump or pump system which provides adequate pumping volume and pressure may be employed in filtration system 110 to pressurize the feed fluid. This includes positive displacement pumps, impeller pumps, head pressure devices, and many others. On the other hand, some pumps and pumping systems will be more efficient than others, and such pumps and systems are particularly contemplated. A particularly efficient pumping system is a two stage turbine pump, such as that depicted in FIG. 2. Here, feed fluid flows first to a relatively low pressure turbine 120A, and then on to a relatively high pressure turbine 120B. The low and high pressure turbines 120A, 120B may advantageously derive power from a single drive shaft 120C and motor 120D, although other embodiments having multiple drive shafts and/or multiple motors are also contemplated.

Energy recovery subsystem 140 may take many different forms, including positive displacement devices (not shown) and turbine devices 140A such as that shown, or a pelton wheel (not shown). In FIG. 2, for example, energy recovery subsystem 140 incorporates a turbine 144, which receives pressurized waste fluid from the production modules 160.

Energy recovery subsystem 140 is also preferably modularly coupled to the pressurizing subsystem 120. In the particular embodiment of FIG. 2, modularization occurs by disposing both pressurizing subsystem 120 and energy recovery subsystem 140 in a common power module 165, and further by utilizing the pump drive shaft to drive shaft 120C to transfer power from the energy recovery subsystem to the low and high pressure turbines 120A, 120B. In alternative embodiments, modularization may also occur by disposing the pressurizing subsystem 120 and the energy recovery subsystem 140 in separate power modules (not shown), which may advantageously be coupled by a common drive train.

There are numerous contemplated advantages to modularization. Modularization of the filters and flow lines into production modules, for example, is highly advantageous because it facilitates construction of filtration systems which are physically disposed in a serial fashion, but are fluidly disposed in a parallel fashion. Such systems are inherently cost effective to build and maintain relative to traditional systems such as that depicted in FIG. 1. Modularization of the pressurizing and energy recovery subsystems is also advantageous from a cost effectiveness standpoint. Among other things, such power modules can be readily inserted and replaced in a given filtration system, and can be substituted interchangeably with corresponding modules in a field of such filtration systems.

Figure 3:
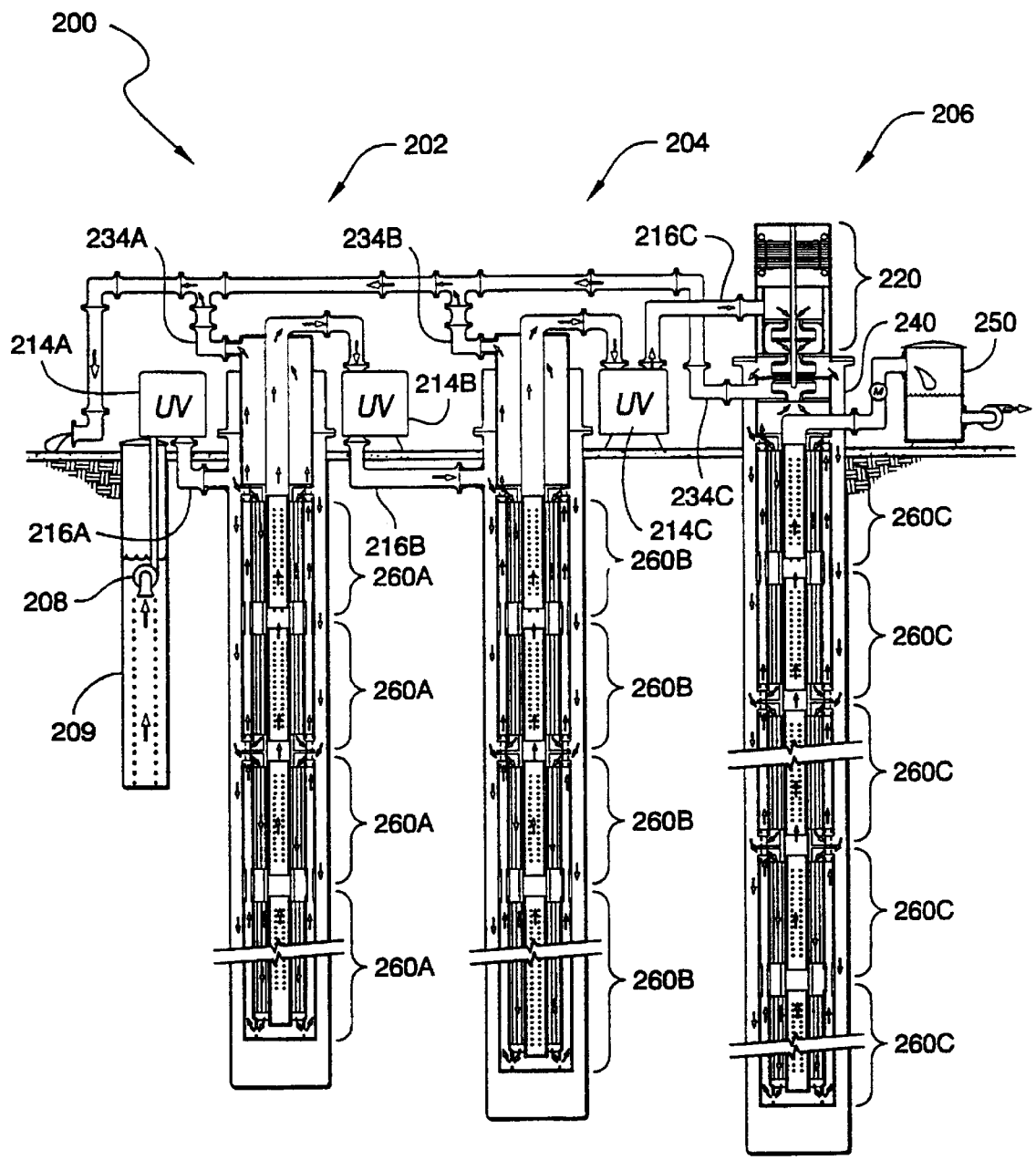
FIG. 3 is a schematic of a field of filtration systems according to the present invention.

Some of these advantages can be more readily visualized from consideration of FIG. 3. In FIG. 3 a field 200 of filtration systems comprises a first micro-filtration system 202, a second, ultra-filtration or non-filtration system 204, and a third, hyper-filtration or reverse osmosis system 206. Many of the parts may advantageously be modularized to enhance interchangeability and cost-effectiveness. For example, each of the filtration systems may have a pretreatment subsystem 214A, 214B and 214C, which in this case may be an ultra-violet or other bactericidal unit. Feed fluid for all of the filtration systems 202, 204 and 206 in the field 200 is provided by well 209, and is pumped to the first pretreatment subsystem 214A by pump 208. The feed fluid then passes to the first filtration system 202 via line 216A, where the feed fluid is filtered in production modules 260A. Waste fluid leaves the first filtration system 202 via line 234A. Permeate from the first filtration system 202 is carried to the second filtration system 204 via line, where further filtration occurs in production modules 260B. Waste fluid leaves the second filtration system 204 via line 234B. Permeate from the second filtration system 204 is carried to the third filtration system 206 via line 216C. At the third filtration system 206, the relatively purified fluid is pressurized by pressurizing subsystem 220, and is further filtered occurs in production modules 260C. Waste fluid leaves the third filtration system 206 via line 234C. Permeate from the third filtration system 206 depressurized using energy recovery subsystem 240, and then passes to holding tank 250.

Of course, the arrangement of systems set forth in FIG. 3 is exemplary only, and many other arrangements are contemplated. For example, FIG. 3 depicts a field 200 in which a feed fluid is progressively more filtered across several serially arrayed filtration systems. In alternative embodiments it may be more appropriate to filter a feed fluid only once, so that the various filtration systems act in parallel rather than series. In yet additional alternative embodiments, a field may employ numerous sources of feed fluid, such as via multiple wells as opposed to a common well. In still further alternative embodiments, the various filtration systems may be disposed in differing attitudes relative to the landscape. For example, some of the systems may be set mostly underground, while others may be near ground level, or disposed in a tower.

Thus, specific embodiments and applications of a filtration system with a modularized energy recovery system have been disclosed. It should be apparent to those skilled in the art, however, that many more modifications besides those already described are possible without departing from the inventive concepts herein. For example, it is particularly contemplated that any or all of the various pumps contemplated, including pumps employed in the pressurization and energy recovery subsystems, herein may or may not be submersible.

The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A filtration system comprising:

a pressurization subsystem that pressurizes a feed fluid;

an elongated outer casing in which are disposed at least one inlet, at least two fluid outlets and a plurality of elongated filtration modules, each of the filtration modules having an opening through which the pressurized feed fluid flows into the module, and a filter that cooperates with the pressurized fluid to produce a pressurized waste fluid and a low pressure filtrate;

wherein the modules are mechanically coupled in series and at least some of the modules are fluidly coupled in parallel;

a mechanical pump that imparts pressure to the feed fluid at the filtration modules and thereby to the waste fluid; and an energy recovery subsystem that recovers energy from the waste fluid that was imparted by the pump.

2. The filtration system of claim 1 wherein the pressurization subsystem is mechanically coupled to the energy recovery subsystem such that energy derived from the energy recovery subsystem is used to drive the pressurization subsystem.

3. The filtration system of claim 2 wherein the pressurization subsystem comprises a turbine.

4. The filtration system of claim 2 wherein the energy recovery subsystem comprises a turbine.

5. The filtration system of claim 2 wherein both the pressurization subsystem and the energy recovery subsystem comprises turbines.

6. The filtration system of claim 2 wherein the pressurization subsystem is mechanically coupled to the energy recovery subsystem via a common drive shaft.

7. The filtration system of claim 2 wherein at least one of the pressurization and energy recovery subsystems include a submersible pump.

8. The filtration system of claim 1, wherein the energy recovery subsystem recovers the energy from the waste fluid after the waste fluid exits the outer casing.

\* \* \* \* \*